(12) United States Patent
Sprunt et al.

(10) Patent No.: US 6,779,130 B2
(45) Date of Patent: Aug. 17, 2004

(54) METHOD AND SYSTEM FOR ROOT FILESYSTEM REPLICATION

(75) Inventors: Roger Craig Sprunt, Tucson, AZ (US);
Bonnie Jean Vining, Tucson, AZ (US);
Daniel Charles Wolfe, Tucson, AZ (US); Bryan John Wright, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 519 days.

(21) Appl. No.: 09/951,372

(22) Filed: Sep. 13, 2001

(65) Prior Publication Data

US 2003/0084368 A1 May 1, 2003

(51) Int. Cl.[7] .............................................. G06F 11/00
(52) U.S. Cl. ................... 714/6; 714/5; 713/2
(58) Field of Search .............................. 714/3, 5, 6, 7; 707/202; 713/2

(56) References Cited

U.S. PATENT DOCUMENTS

| | | | |
|---|---|---|---|
| 5,155,845 A | | 10/1992 | Beal et al. |
| 5,247,659 A | * | 9/1993 | Curran et al. ................... 713/1 |
| 5,535,411 A | * | 7/1996 | Speed et al. .................... 713/2 |
| 5,905,888 A | * | 5/1999 | Jones et al. .................... 713/2 |
| 5,913,926 A | | 6/1999 | Anderson et al. |
| 5,978,565 A | | 11/1999 | Ohran et al. |
| 6,061,194 A | | 5/2000 | Bailey |
| 6,112,255 A | | 8/2000 | Dunn et al. |
| 6,154,835 A | | 11/2000 | Chrabaszcz et al. |
| 6,195,695 B1 | * | 2/2001 | Cheston et al. ............. 709/221 |
| 6,249,879 B1 | * | 6/2001 | Walker et al. ................ 714/11 |
| 6,643,795 B1 | * | 11/2003 | Sicola et al. ................... 714/6 |
| 2002/0112198 A1 | * | 8/2002 | Lim et al. ....................... 714/7 |

FOREIGN PATENT DOCUMENTS

WO     WO 00/39690     7/2000

OTHER PUBLICATIONS

Liskov et al., "A Replicated Unix File System", Management of Replicated Data, 1990. Proceedings., Workshop on the, vol., Iss., Nov. 8–9, 1990, pp.: 11–14.*

* cited by examiner

Primary Examiner—Robert Beausoliel
Assistant Examiner—Gabriel L. Chu
(74) Attorney, Agent, or Firm—Scully, Scott, Murphy & Presser; Juan M. Barkley, Esq.

(57) ABSTRACT

According to the present invention, there is provided a method, system and program storage device for maintaining an active root filesystem in a storage subsystem comprising a plurality of storage devices. The method, system and program storage device comprise searching root partitions of the plurality of storage devices for a valid root filesystem, the root filesystem including mount points associated with the plurality of storage devices; mounting a root filesystem that is found first as the active root filesystem and mounting root partitions of the plurality of storage devices to the associated mount points within the active root filesystem; and replicating the active root filesystem across the plurality of storage devices in the storage subsystem, wherein the storage subsystem is bootable from any storage device of the plurality of storage devices that includes a replica of the active root filesystem. The method, system and program storage device further replicate the active root filesystem in response to storage subsystem configuration requests, and notifications of new or replaced disk drives being installed in the storage subsystem.

27 Claims, 5 Drawing Sheets

| ACTIVE ROOT FILESYSTEM | PARTITIONS MOUNTED | PARTITION ROOT FLAG |
|---|---|---|
| / | <=========== DISK 0 ROOT PARTITION | ON |
| /mpt1 | <=========== DISK 1 ROOT PARTITION | ON |
| /mpt2 | <=========== DISK 2 ROOT PARTITION | ON |
| /mpt3 | <=========== DISK 3 ROOT PARTITION | ON |
| /mpt4 | <=========== DISK 4 ROOT PARTITION | ON |
| /mpt5 | <=========== DISK 5 ROOT PARTITION | ON |

FIG. 4B

| ACTIVE ROOT FILESYSTEM | PARTITIONS MOUNTED | PARTITION ROOT FLAG |
|---|---|---|
| / | <=========== DISK 1 ROOT PARTITION | ON |
| /mpt1 | <=========== NOTHING MOUNTED | NULL |
| /mpt2 | <=========== DISK 2 ROOT PARTITION | ON |
| /mpt3 | <=========== DISK 3 ROOT PARTITION | ON |
| /mpt4 | <=========== DISK 4 ROOT PARTITION | ON |
| /mpt5 | <=========== DISK 5 ROOT PARTITION | ON |

FIG. 5

METHOD AND SYSTEM FOR ROOT FILESYSTEM REPLICATION

BACKGROUND OF THE INVENTION

1. Technical Field of the Invention

The present invention generally relates to root filesystem redundancy. More particularly, the present invention is directed to a method, system and program storage device for providing improved recovery of a root filesystem from a single disk drive in a storage subsystem having a plurality of disk drives without the added expense of providing Redundant Array of Independent Disks (i.e., "RAID") hardware support.

2. Description of the Prior Art

The ever-increasing use of information technology has spawned a greater need for vast amounts of data to be stored in an online format, readily accessible by a number of different requesters while contained in a medium that offers high security and reliability for online applications. While hard drives have proven to be a cornerstone in providing a solution to these needs—a sound medium that can quickly share and store data—the task has proven to be too great for any single hard drive to accomplish on its own. Different systems have emerged to harness a plurality of disk drives into a so-called large virtual disk drive. That is, the different systems have united the capacity of the plurality of disk drives into a common storage subsystem, while providing for increased data reliability (i.e., fault tolerance) and fast data throughput capabilities (i.e., improved performance).

For example, a Redundant Array of Independent Disks ("RAID") is a widely utilized storage subsystem for employing a plurality of disk drives in combination (i.e., an array of disk drives) for providing fault tolerance and improved performance. The RAID array of disk drives is frequently utilized on servers, but generally is not necessary for personal computers. There are generally six different RAID levels (i.e., levels zero through five) that provide various levels of fault tolerance and performance, with levels zero, one and five being the most commonly utilized levels.

Level zero provides for data striping, i.e., spreading out blocks of each file (i.e., data) across multiple disk drives, but this level does not provide for redundancy. Since no redundant information is stored for level zero, the failure of a disk drive in the array of disk drives that includes a root filesystem (described herein below) results in storage subsystem being unbootable. Thus, level zero provides overall very good performance, but it does not deliver fault tolerance, particularly for the root filesystem. Level one provides disk mirroring, a technique for writing each file (i.e., data) to two duplicate disks simultaneously. Disk mirroring is most commonly used in an on-line database storage subsystem where it is critical that data be accessible at all times. In level one, if one of the disk drives fails, the storage subsystem can instantly switch to the other disk drive without any loss of data or service, or the system is enabled to boot from a mirrored disk drive if the other disk drive fails. Thus, level one provides performance that is the same or slightly lower than a single drive, but concurrently provides some level of fault tolerance, although with a high cost of storage (i.e., significant additional storage requirements for mirroring). Level 5, provides for data striping with distributed parity, i.e., parity being distributed over at least three operational disk drives. Thus, level 5 affords excellent performance and good fault tolerance, although adding significant costs in terms of hardware support, by requiring a plurality of operational disk drives for storing parity information. Thus, in level 5, a failure of more than one disk drive in the storage subsystem will result in the storage subsystem becoming unbootable.

Hardware-based RAID storage subsystems utilize a RAID controller board, which is a backbone hardware element for the RAID's array of disks. It not only distributes input/output (i.e., "I/O") operations to specific disk drives in the array of disks, but it also provides a physical link to each of the independent disk drives in the array of disks so that a disk drive may easily be removed and/or replaced. The RAID controller further monitors the integrity of each disk drive in the array of disk drives to anticipate the need to move data should the array of disk drives be placed in jeopardy by a faulty or a failing disk drive, thereby providing fault tolerance, i.e., transparent recovery from disk drive failure.

Contrary to a RAID storage system that provides for hardware support for the plurality of disk drives in the storage subsystem, a storage subsystem that does not utilize hardware support (i.e., RAID controller board) utilizes device adapters (described hereinbelow) to perform input/output (i.e., "I/O") operations to the plurality of disk drives in the storage subsystem. Unlike the RAID controller board that distributes I/O operations to specific disk drives in the storage subsystem, device adapters merely relay I/O operations to specific disk drives in the storage subsystem as requested. Device adapters that may be utilized in the storage subsystem include variants of the small computer system interface ("SCSI"), fibre channel ("FC"), cabling and the like. A SCSI interface provides data transfer rates of up to 80 megabytes per second ("MBps"), enabling mass storage devices (e.g., plurality of disk drives) to be attached to the single SCSI interface. FC is a serial data transfer architecture that is being standardized by the American National Standards Institute ("ANSI"). A most prominent FC is a Fibre Channel Arbitrated Loop (i.e. "FC-AL"), designed for mass storage subsystems that require high bandwidth (e.g., data transfer rates of 100 MBps) by using optical fiber to connect the mass storage devices (e.g., plurality of disk drives). Cabling interface represents any bus architecture to which disk drives in the storage subsystem may physically be attached, such as SCSI cables (i.e., 68 copper wire bus architecture), FC cables (i.e., 4 copper wire or 2 fiber optic cables), SSA cables (i.e., 4 copper wires used in an SSA serial Bus architecture) and the like.

In general, a root filesystem must be as small as possible and must include sufficient information to at least boot a storage subsystem, since a corrupted root filesystem invariably makes a storage subsystem unbootable except with the use of a bootable disk, such as a floppy disk or the like. The root filesystem is included in a particularly designated partition of a disk drive, such as a root RAID partition in a RAID storage subsystem. Thus, in a storage subsystem that includes a plurality of mass storage devices (i.e., disk drives), it is advantageous and would be highly desirable to enable the storage subsystem to boot from any of the plurality of disk drives, thereby improving fault tolerance (i.e., redundancy) of the root filesystem. Although, the hardware-based RAID storage subsystem provides for root filesystem redundancy through RAID's level 1 and level 5, as particularly described hereinabove the RAID's root filesystem redundancy requires hardware support.

Software-based RAID storage subsystems require that a software RAID subsystem, which is necessary to manage root filesystem, be loaded and operational before it can manage the root filesystem in the RAID storage subsystem. That is, RAID configuration data for the plurality of disk drives in the storage subsystem, which is typically stored in the root filesystem, has to be obtained as part of the starting of the software RAID subsystem. Because the root filesystem must be available prior starting the software-based RAID storage subsystem, the software RAID subsystem cannot manage the root filesystem, i.e., be utilized to provide for improved recovery of the root filesystem.

Therefore there is a need in the art for providing a system and method for improved recovery of a root filesystem from a single disk drive in a storage subsystem having a plurality of disk drives without the added expense of providing RAID hardware support.

SUMMARY OF THE INVENTION

It is therefore an object of the present invention to provide a system, method and program storage device for recovery of a root filesystem for a storage subsystem without the added hardware expense of providing RAID support.

It is another object of the present invention to provide a system, method and program storage device for an improved level of root filesystem recovery over a RAID storage subsystem.

It is yet another object of the present invention to provide a system, method and program storage device for an improved level of root filesystem recovery by utilizing software techniques as compared to a RAID storage subsystem utilizing hardware support.

It is a further object of the present invention to provide a system, method and program storage device for recovery of a root filesystem from a single disk drive within a storage subsystem comprising a plurality of disk drives.

It is yet a further object of the present invention to provide a system, method and program storage device for enabling the storage subsystem to boot from a single operational disk drive within the storage subsystem comprising a plurality of disk drives, one or more of which have failed.

According to an embodiment of the present invention, there is provided a method for maintaining an active root filesystem in a storage subsystem comprising a plurality of storage devices, the method comprising: searching root partitions of the plurality of storage devices for a valid root filesystem, the root filesystem including mount points associated with the plurality of storage devices; mounting a root filesystem that is found first as the active root filesystem and mounting root partitions of the plurality of storage devices to the associated mount points within the active root filesystem; and replicating the active root filesystem across the plurality of storage devices in the storage subsystem, wherein the storage subsystem is bootable from any storage device of the plurality of storage devices that includes a replica of the active root filesystem According to another embodiment of the present invention, there is provided a storage subsystem for maintaining an active root filesystem, the storage subsystem comprising a plurality of storage devices, the storage subsystem comprising a root filesystem manager for: searching root partitions of the plurality of storage devices for a valid root filesystem, the root filesystem including mount points associated with the plurality of storage devices; mounting a root filesystem that is found first as the active root filesystem and mounting root partitions of the plurality of storage devices to the associated mount points within the active root filesystem; and replicating the active root filesystem across the plurality of storage devices in the storage subsystem, wherein the storage subsystem is bootable from any storage device of the plurality of storage devices that includes a replica of the active root filesystem.

According to a further embodiment of the present invention, there is provided a program storage device, tangibly embodying a program of instructions executable by a machine to perform a method for maintaining an active root filesystem in a storage subsystem comprising a plurality of storage devices, the method comprising the steps of: searching root partitions of the plurality of storage devices for a valid root filesystem, the root filesystem including mount points associated with the plurality of storage devices; mounting a root filesystem that is found first as the active root filesystem and mounting root partitions of the plurality of storage devices to the associated mount points within the active root filesystem; and replicating the active root filesystem across the plurality of storage devices in the storage subsystem, wherein the storage subsystem is bootable from any storage device of the plurality of storage devices that includes a replica of the active root filesystem.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT OF THE INVENTION

The present invention is directed to a method and system for providing improved recovery (i.e., fault protection) of a root filesystem from a single disk drive in a storage subsystem having a plurality of disk drives in a non-RAID environment, i.e., without the added expense of RAID hardware support.

Figure 1:
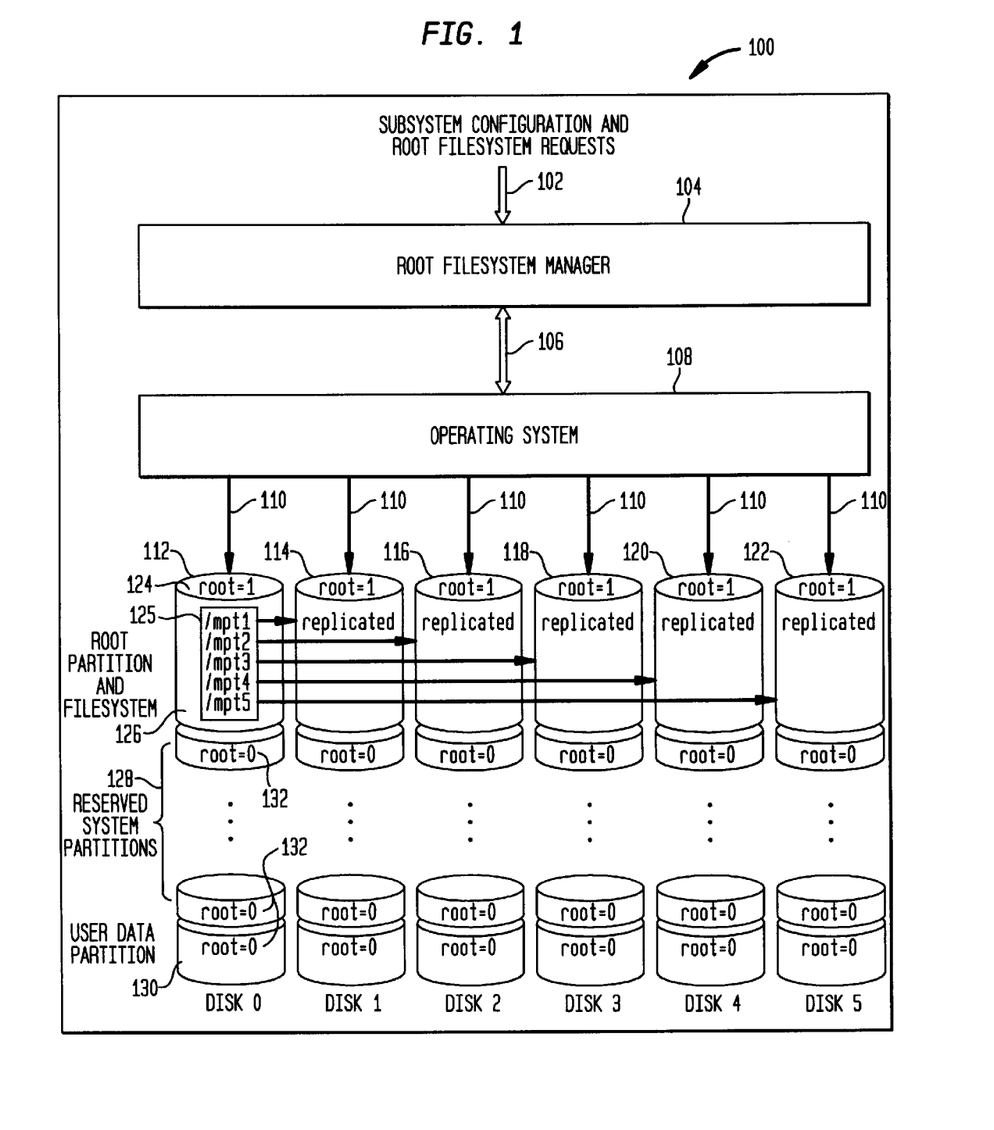
FIG. 1 is an exemplary block diagram depicting a storage subsystem that includes a root filesystem according to the present invention.

FIG. 1 is an exemplary block diagram depicting a storage subsystem 100 that includes a root filesystem 125 according to the present invention. The root filesystem manager 104 receives requests 102, such as configuration requests for the storage subsystem 100 and root filesystem notifications/requests for the root filesystem 125. The storage subsystem configuration requests may include requests to modify (i.e., configure) network settings, security settings, user/group settings, directory sharing settings, and the like. The different configurable settings are part of the active root file system and are maintained in configuration files in the active root filesystem. For example, if a new password were issued to a user, a password configuration file on the active root filesystem would be modified to reflect this change. Configuration requests to modify the foregoing configurable settings may be made via an application layer, such as a Web server that services remote configuration requests. The root filesystem notifications/requests may include new disk drive insertion and failed disk drive replacement notifications/requests, which affect where in the active root filesystem root partitions of particular new/replacement disk drives are mounted. The notifications/requests for the root filesystem are initiated by the operating system 108 via callback routines to application program interfaces (i.e., "APIs"). Typically, applications register with an operating system by providing the operating system with pointers to functions to be called in response to certain events. Thus, the root filesystem manager 104 registers with the operating system 108 for receiving root filesystem notifications/requests that affect the root filesystem 125, i.e., for receiving notifications/requests that affect data stored in the root filesystem 125. The root filesystem manager 104 also provides APIs that the application layer, such as the foregoing Web server, may call to ensure that root filesystem is replicated successfully after the configuration notifications/requests that update the root filesystem are processed. The operating system 108 provides the APIs for managing the storage subsystem 100 as well as the root filesystem 125. The APIs provided by the operating system 108 are utilized (i.e., executed) by the root filesystem manager 104 for maintaining the root filesystem 125 and the storage subsystem 100 according to received requests 102, in accordance with the present invention. A suitable operating system that may be utilized for the foregoing functionality is Linux operating system, although as readily is apparent to one skilled in the art, any operating system providing the foregoing functionality may successfully be utilized according to the present invention.

Further with reference to FIG. 1, the operating system 108 of the storage subsystem 100 is operationally connected to the plurality of disk drives 112 . . . 122. The operating system 108 communicates with the plurality of disk drives 112 . . . 122 via device driver APIs 110 that are appropriate to the particular device adapters, which may include SCSI, FC, cabling, and the like. For both clarity and brevity, the storage subsystem 100 comprises six disk drives, i.e., disk drive 0 represented by reference number 112, disk drive 1 represented by reference number 114, disk drive 2 represented by reference number 116, disk drive 3 represented by reference number 118, disk drive four represented by reference number 120, and disk drive 5 represented by reference number 122. However, it should be noted that the storage subsystem is not limited to the number of disk drives or the partitions disclosed. Each of the disk drives 0 through 5 in the storage subsystem 100, i.e., respectively numbered 112 . . . 122, is partitioned into the following partitions: 1) a root partition 126 that includes a root filesystem 125 (whether "active" or "replicated" root filesystem as hereinafter described with reference to FIGS. 4(a)–(b) and 5) and partition root flag 124 that is stored in a reserved area of the root partition 126; 2) one or more reserved system partitions 128 that may be utilized for swap space and root filesystem rebuilding area according to the present invention; and 3) a user data partition 130 for storing user data. Preferably, the partition root flag 124 that is provided in the root partition 126 is set to "true" (i.e., partition root flag=1) to indicate that the root partition 126 includes a valid root filesystem, while the partition flags 132 are set to "false" (i.e., partition root flag=0) for all other partitions 128 and 130 to indicate that these partitions have no valid root filesystems. Alternatively, the partition root flag 124 may only be provided in the root partition 126, with the remaining partitions 128 and 130 receiving no partition flag 132.

Figure 2:
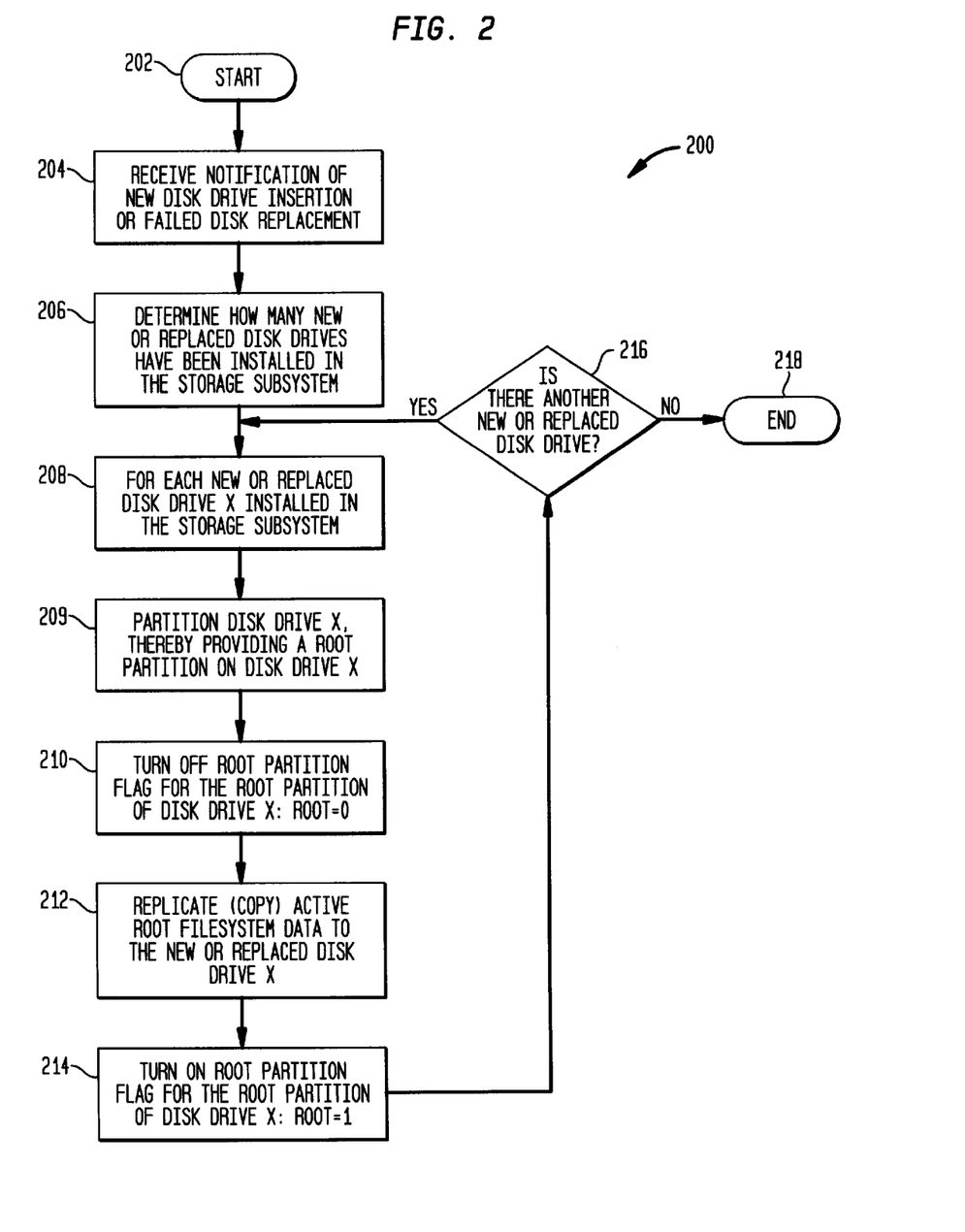
FIG. 2 is an exemplary method flowchart depicting modification of the root filesystem depicted in FIG. 1 after insertion of a new disk drive or replacement of a failed disk drive in the storage subsystem according to the present invention.

FIG. 2 is an exemplary method flowchart 200 depicting modification of the root filesystem depicted in FIG. 1 after insertion of a new disk drive or replacement of a failed disk drive in the storage subsystem according to the present invention. The method for flowchart 200 starts at step 202. At step 204, the storage subsystem 100 receives a notification of new disk drive insertion or failed disk drive replacement at the root filesystem manager 104 from the operating system 108 via the callback mechanism described herein, as illustrated by arrow 102 of FIG. 1. At step 206, the root filesystem manager 104 executes APIs provided by the operating system 108 to determine how many new or replaced disk drives have been installed in the storage subsystem 100. The following steps 208 . . . 218 are particularly depicted in exemplary pseudo code listing for programming functions partition_disk( ) illustrated in hereinbelow in Table 1 and replicateRootFiles( ) in Table 2. It should be noted that the partition_disk( ) function is called by the root filesystem manager 104 for each new/replaced disk drive inserted into the storage subsystem 100 after receiving notification from the operating system 108 that a new/replaced disk drive has been inserted into the storage subsystem 100. The partition_disk drive( ) function in turn calls the replicatedRootFiles( ) function illustrated in Table 2 hereinbelow to replicate (i.e., copy) the active root filesystem to the root partition 126 of the new/replaced disk drive inserted into the storage subsystem 100. Thus, at step 208 for each new or replaced disk drive X in the storage subsystem, the root filesystem manager at step 210 executes APIs provided by the operating system 108 to set to "false" the partition root flag 124 for the root partition of disk drive X. At step 209, the newly added or replaced disk drive is partitioned (i.e., initParts( ) function), thereby providing a root partition, as particularly illustrated below in Table 1. As noted in the foregoing, the partition root flag is set to "false" to indicate that the root partition 126 of a disk drive does not include a valid root filesystem. The partition root flag ensures the integrity of the root partition that includes a replicated root filesystem on the disk drive because if something were to happen during replication (e.g., an unexpected momentary power interruption resulting in a rebooting of the storage subsystem), the partition root flag 124 would still be set to "false" and during initialization (particularly described with reference to FIG. 5) the root partition would not be recognized as having a valid root filesystem and will thereafter receive a replicated root filesystem.

Further with reference to FIG. 2, at step 212 the root filesystem manager 104 executes APIs of the operating system 108 to replicate (i.e., copy) the "active" root filesystem from the disk drive that has during initialization in a boot/reboot been designated as including the "active" root filesystem to the new or replaced disk drive X. Thereafter, at step 214 the root filesystem manager 108 executes APIs of the operating system 108 to set the root partition flag 124 for the root partition of disk drive X to "true", thereby designating that disk drive X includes a valid version of the root file system. Thus, the partition root flag 124 of the disk drive is only set to "true" when replication has been completed, thus ensuring that the root partition 126 includes a valid root filesystem, one that successfully has been replicated from the active root filesystem. Therefore, during any subsequent reboot the root filesystem stored on the disk drive may be mounted as the active root filesystem. At step 216, if it is determined that there is another new or replaced disk drive X, the method continues at step 208, otherwise the method flowchart 200 ends at step 218.

Figure 3:
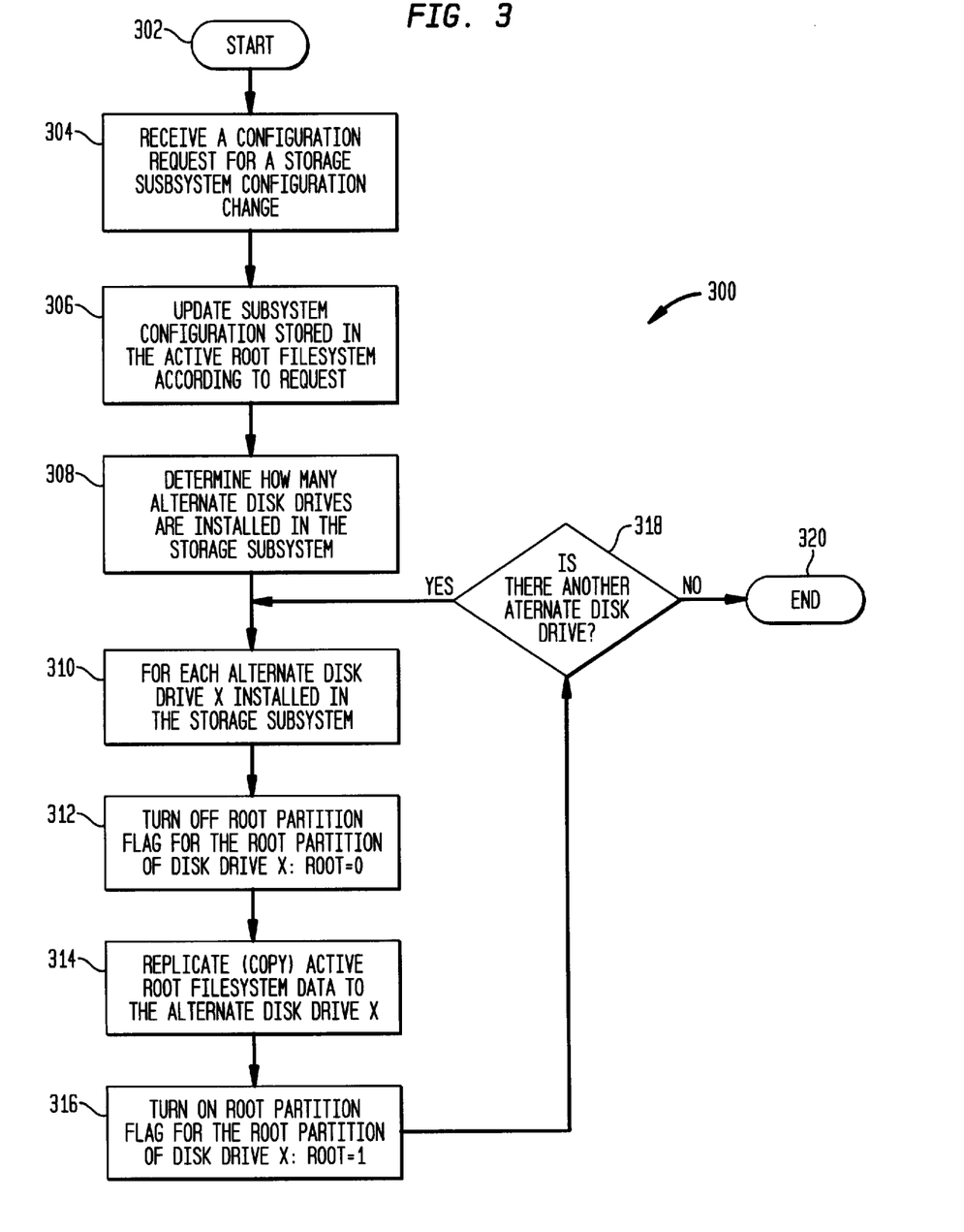
FIG. 3 is an exemplary method flowchart depicting modification of the root filesystem depicted in FIG. 1 after receiving a configuration request for the storage subsystem according to the present invention.

Table 1 hereinbelow particularly illustrates pseudo code for functions partition_disk( ) and replicateRootDir( ) for replicating the active root filesystem on a new/replaced storage devices (i.e., disk drives) inserted into the storage subsystem according to the present invention.

server calls the root filesystem manager 104 to update the storage subsystem 100 configuration stored in the active root filesystem according to the received configuration request. After the configuration is updated at step 306, the Web server calls the root filesystem manager 104 to replicate the active root filesystem as depicted in the following steps 308 . . . 318, which are particularly illustrated in exemplary listing of pseudo code for functions replicateSystemDir( ) and replicateRootFiles( ) in Table 2. At step 308, the root filesystem manager 104 executes APIs of the operating system 108 to determine how many disk drives are installed in the storage subsystem 100 in Table 2 determines mount points and associated disks). Subsequently, at step 310 for each alternate disk drive X in the storage subsystem, the root

TABLE 1

```
/*
************************************************************************
* Function partition_disk( ) is called when a new disk has been added to the system as a result
* of replacing a bad disk, or expanding the system by adding a new disk to an empty slot.
* This function will setup the root partition and other partitions, and the replicate the root
* filesystem of root disk to the new or replaced disk.
************************************************************************
*/
partition_disk(const char *disk, const char *root_disk)
{
    char **files = NULL;
    char **directories = NULL;
    char *mountPoint = NULL;
    /* First perform check to make sure that the root disk is not re-partitioned */
    IF disk is the same as root_disk THEN
    return (-1);
    END IF
    /* Establish partitions on the disk and create a root filesystem in the root partition*/
    initParts(disk);
    directories = getSystemDirectoryNames(root_disk) //   get a list of directories in the active
                                                         root partition that should be replicated
    mountPoint = getDiskMountPoint(disk); // get the mount point name for the disk
    rootFlagSwitch(disk,off); // turn root flag off for the disk
    getSystemDirectoryInfo(directories, files); // get list of files for each directory in directory list
    replicateRootDir(mountPoint, directories); // replicate all directories in list to the disk
    replicateRootFiles(mountPoint, files); // replicated files in the list to the directories on disk
    rootFlagSwitch(disk, on) // turn root flag on for the disk
}
*
************************************************************************
* This function takes a list of directories from the root partition on the active root disk drive and
* replicates the directories to a mount point that represents a disk drives in the storage subsystem,
* which is not the active root disk drive.
************************************************************************
*/
replicateRootDir( const char *mountPoint, const char **directories)
{
    char *directory = NULL;
    char *dir_path[MAX(PATHLEN];
    FOR each directory in the directories array DO
        /* create the directory under the mount point passed into the function */
        sprintf(dir_path, "%s%s", mountPoint, directory);
        mkdir(dir_path);
    END FOR
```

FIG. 3 is an exemplary method flowchart 300 depicting modification of the root filesystem depicted in FIG. 1 after receiving a configuration request for the storage subsystem according to the present invention. The method for flowchart 300 starts at step 302. At step 304, the storage subsystem 100 receives a configuration request at the root filesystem manager 104 for a storage subsystem configuration change from an application layer such as a Web server, as illustrated by arrow 102 of FIG. 1. The configuration request is made via a Web client configurator tool. The Web server receives the configuration request and determines whether the request modifies a configuration file as described hereinabove. If a configuration file is to be modified, then at step 306, the Web filesystem manager at step 312 executes APIs provided by the operating system 108 to set the partition root flag to "false" (i.e., function rootFlagSwitch(OFF) in Table 2). At step 314, the root filesystem manager 104 executes APIs of the operating system 108 to replicate (i.e., copy) the "active" root filesystem from the disk drive that has during initialization at boot/reboot been designated as including the "active" root filesystem to the alternate disk drive X (i.e., function replicateRootFiles( ) in Table 2). Thereafter, at step 316 the root filesystem manager 108 executes APIs of the operating system 108 to set the partition root flag 124 for the root partition of the alternate disk drive X to "true" (i.e., function rootFlagSwitch(ON) in Table 2), thereby designating that disk drive X includes a valid version of the root file system. At step 318, if it is determined that there is another alternate disk drive X, the method continues at step 310, otherwise the method flowchart 300 ends at step 320.

Figure 4A:
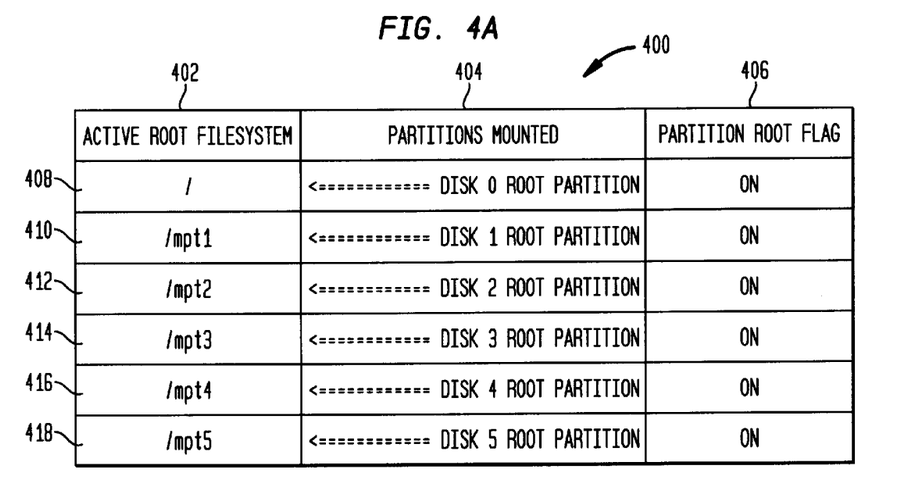
FIG. 4(a) is an exemplary representation of a normal root file system according to the present invention.
Figure 5:
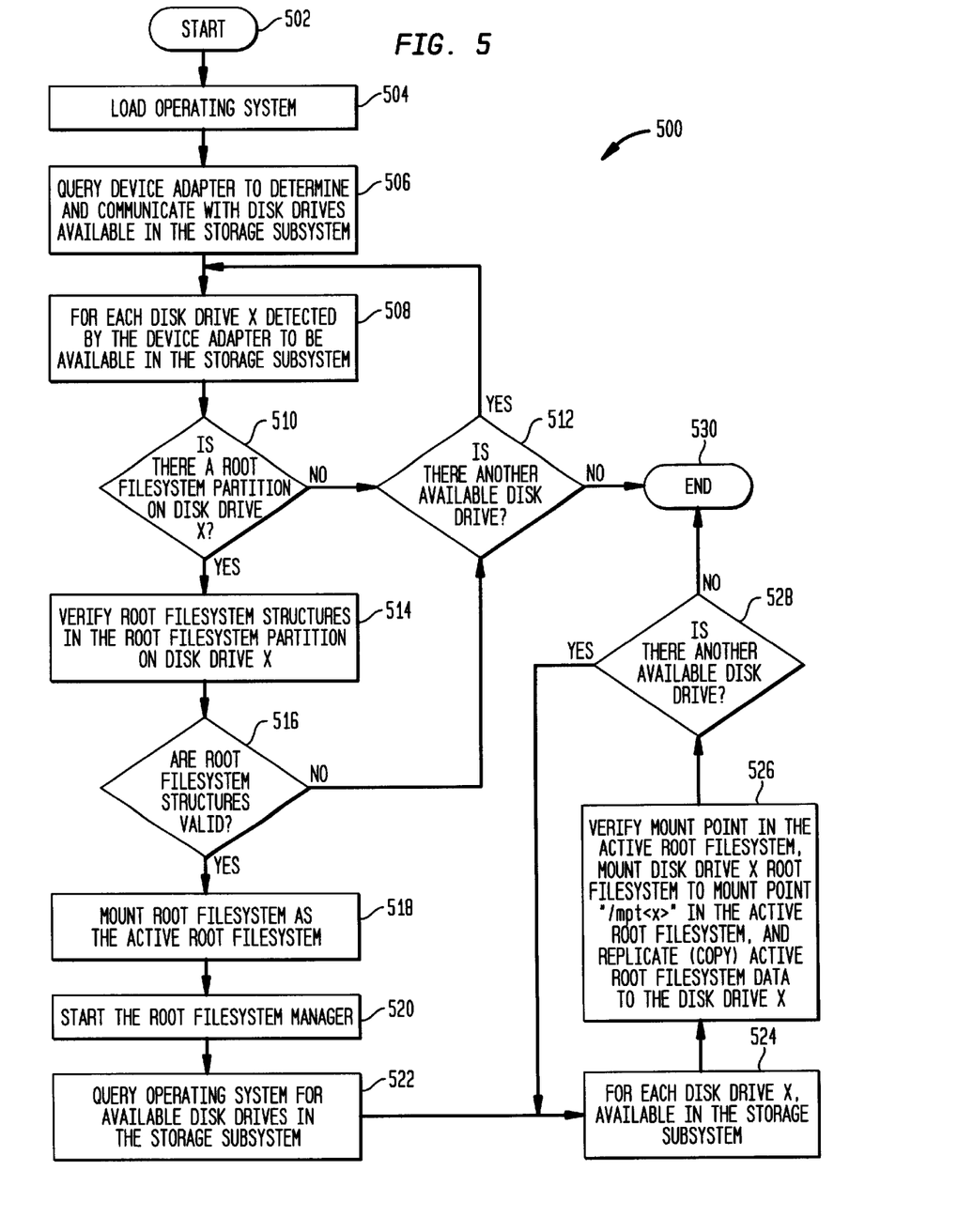
FIG. 5 is an exemplary method flowchart depicting initialization of the root filesystem in the storage subsystem depicted in FIG. 1 at boot/reboot time according to the present invention.

Table 2 hereinbelow particularly illustrates pseudo code for functions replicateSystemDir( ) and replicateRootFiles( ) for replicating the active root filesystem across the plurality of storage devices (i.e., disk drives) in the storage subsystem according to the present invention.

drives 1 through 5 that are respectively numbered 114 . . . 122, during initialization as particularly depicted in FIG. 5. The active root filesystem 402 comprises illustrative mounting points "/mpt<x>", i.e., directories 408 . . . 418, in which root partitions of the replicated root filesystems for disk drives 1 through 5 are mounted, as will be described in greater detail with reference to FIG. 5. For example, forward slash "/" 408 represents the directory in which the root partition for disk drive 0 is mounted, while "/mpt1" through "/mpt5", i.e., respectively numbered 410 . . . 418, represent

TABLE 2

```
/*
*******************************************************************************
* This Function replicates a system directory and takes a directory parameter.
*******************************************************************************
*/
replicateSystemDir(const char *directory)
{
    char **mountPoints = NULL;
    char **diskNames = NULL;
    char **directories = NULL;
    char **files = NULL;
    directories =  get SystemDirectoryNames(directory); /* get a list of directories for the active
                root filesystem on the root partition to be replicated */
    getSystemDirectoryInfo(directories, files); /* get a list of files in each directory in the
                directory list to be replicated */
    mountPointCheck(mountPoints, diskNames); /* returns list of mount points and disk names
                to which the directories and the files are to be replicated */
    /* Loop to replicate each disk other than the root */
    FOR each mount point in the mount points list DO
        RootFlagSwitch(diskNames[index], off); // turn off root flag
        replicateRootFiles(mountPoints[index], files); // replicate file in the list of files
        rootFlagSwitch(diskNames[index], on); // turn root flag on
    END FOR
}
/*
*******************************************************************************
* This function takes a mount point parameter and a pointer to a list of files to be replicated.
* Each file is read from the root disk, and copied to the target disk.
*******************************************************************************
*/
replicateRootFiles(const char *mountPoint, char **files)
{
    char *file = NULL;
    char *fileName[NAMESIZE]
    char pbuffer[BUFSIZE];
    int infile, outfile;
    size_t size, nread, nwrite;
    FOR each file in the files list DO
        stat(file); // verify whether the file exists on the root disk
        infile = open(file, O_RDONLY); // open the file in read only mode
        /* Create a directory on the disk being replicated if necessary */
        /* Create the file in the directory on the disk being replicated */
        sprintf(fileName, "%s%s", mountPoint, file);
        outfile = open(fileName);
        /* if the file was created successfully write out replica to the disk */
        WHILE ((nread = read(infile, pbuffer, NASBUFSIZE)) > 0) DO
            write(outfile, pbuffer, nread);
        END WHILE
        close(infile);
        close(outfile);
    END FOR
}
```

FIG. 4(a) depicts an exemplary normal layout of the active root filesystem on the active root disk drive, i.e., no disk drive failures having occurred in the storage subsystem 100. As mentioned herein, disk drive 0, i.e., reference number 112 of FIG. 1, includes the "active" root filesystem 402 and a partition root flag 406 that is set to "true". Reference number 404 represents root partitions for the root filesystems of disks 0 through 5 that are mounted in the "active" root filesystem 402 of disk 0. It should be noted that the "active" root filesystem is replicated (i.e., copied) across all the disk drives in the storage subsystem 100, i.e., disk the mounting points (i.e., directories) in which the replicated root partitions of the root filesystem for disk drives 1 through 5 are mounted.

Figure 4B:
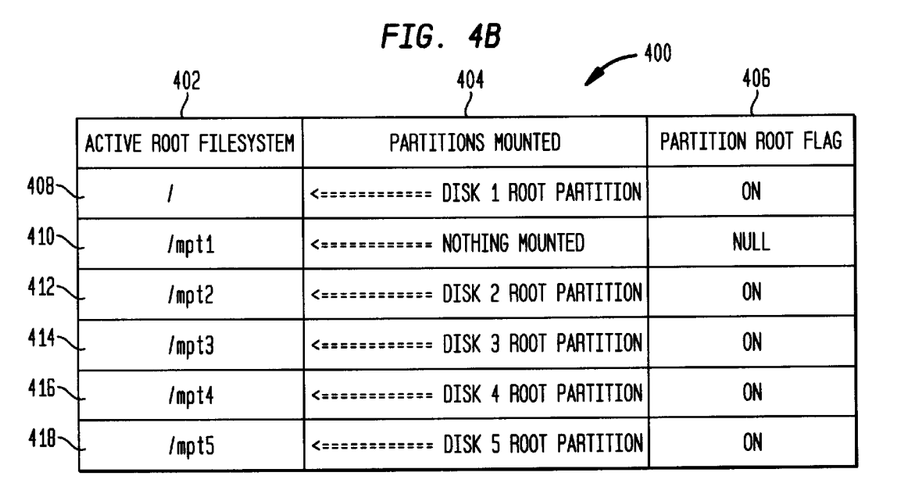
FIG. 4(b) is an exemplary representation of the root file system after failure of a disk drive according to the present invention.

FIG. 4(b) depicts an exemplary layout of the root file system after a failure of a disk drive that includes the "active" root filesystem (i.e., failure of disk drive 0, reference number 112 in FIG. 1) and a hot boot of the storage subsystem 100 according to FIG. 5. That is, if a read/write/update operation to a disk drive that includes the "active" root filesystem fails, the root filesystem manager 104 is notified by the operating system 108 via a callback function of this failure and the root filesystem manager 104 initiates a reboot of the storage subsystem 100, as particularly described with reference to FIG. 5. For example, assuming that the "active" root filesystem on disk drive 0, the root partition of which was mounted in a mounting point designated as "/" (i.e., reference number 408 in FIG. 4(a)), cannot be read during a read/write/update operation, the root filesystem manager 104 initiates a reboot of the storage subsystem 100. Upon rebooting, as will particularly be described with reference to FIG. 5, the operating system 108 initializes the storage subsystem 100 by executing APIs to determine the status of disk drives of the storage subsystem 100. As illustrated in particular detail in FIG. 5, upon determining that disk drive 0 root partition cannot be read, the operating system 108 searches for a next available disk drive, which includes a root partition that can be read by the operating system 108 and which includes a partition root flag that is set to "true", thereby representing a replica of the active root filesystem of disk drive 0. It should be noted that the partition root flag 124 ensures that a replicated root filesystem may be utilized as the "active" root filesystem when a disk drive including a currently active root filesystem fails. With particular reference to the storage subsystem of FIG. 1, the operating system 108 locates disk drive 1 (i.e., designated by reference number 114), which includes a partition root flag 124 that is set to "true". The operating system 108 loads the replicated root filesystem 402 on disk drive 1 into RAM, which now becomes the "active" root filesystem. Now referring back to FIG. 4(b), disk drive 1 root partition is thus mounted into the root directory "/" 408, while nothing is mounted in mounting point "/mpt1" 410 and the partition root flag 406 for this mounting point is NULL. The remaining root partitions for disk drives 2 through 5 remain the same. The active root filesystem of disk drive 1 is now replicated (i.e., copied) across all disk drives of the storage subsystem 100, i.e., disk drives 2 through 5, particularly denoted by respective reference numbers 116 . . . 122. Subsequently, the method flowchart of FIG. 2 would be executed upon replacement of disk drive 0 with a new disk drive by a maintenance technician. As more particularly illustrated with reference to FIG. 2, the new disk that will replace disk drive 0 receives a replica (i.e., copy) of the active root filesystem. Thereafter, upon any subsequent reboot of the storage subsystem, disk drive 0 replicated copy of the active root filesystem will be utilized to mount the active root filesystem, its root partition will be mounted into the root directory "/", and disk drive 1 through 5 root partitions will be mounted into exemplary mounting points "/mpt1" through "/mpt5". This in effect restores the normal layout of the active root filesystem particularly depicted in FIG. 4(a).

FIG. 5 is an exemplary method flowchart 500 that depicts initialization of the root filesystem in the storage subsystem 100 depicted in FIG. 1 at boot/reboot time according to the present invention. The initialization of the root filesystem 126 for the storage subsystem 100 (i.e., storage subsystem startup) starts at step 502. At step 504, the operating system 108 of FIG. 1 is loaded. The operating system is conventionally loaded, the loading process being initiated from flash memory (e.g., basic input/output system—"BIOS") or other equivalent firmware means, and continuing through to the execution of the initial program load (i.e., "IPL"), which loads the operating system. At step 506, the operating system 108 executes device driver APIs 110 of FIG. 1 to query a device adapter via device driver APIs 110 for determining and communicating with disk drives in the storage subsystem 100, such as for example, disk drive 0 through disk drive 5 of FIG. 1, which are respectively numbered 112 . . . 122. At step 508, for each disk drive X detected by the device adapter to be available in the storage subsystem 100, at step 510 the operating system 108 determines whether disk drive X includes a root filesystem partition, such as root filesystem partition 126 of disk drive 0, which is numbered 112. If there is no root filesystem partition on disk drive X, the method continues at step 512, where a determination is made whether there is another available disk drive in the storage subsystem 100, such as disk drives 1 through 5. If there is no other available disk drive in the storage subsystem 100, the method flowchart completes at step 530, where one or more error messages may be generated reporting that the system is unable to initialize at boot/reboot time. However, if there is another available disk drive at step 512, the method flowchart continues to step 508 to process the next available disk drive in order to find a valid root filesystem partition.

Returning now to step 510 of FIG. 5, if disk drive X includes a root filesystem partition (e.g., root partition 126 in FIG. 1), then at step 514 the operating system 108 verifies filesystem structures on disk drive X (e.g., disk drive 0 in FIG. 1). At step 516, the operating system verifies the integrity of the filesystem structures for the root filesystem (e.g., 125 in FIG. 1), i.e., whether the filesystem structures are valid or corrupt. Filesystem structures include the directory structure, the files included within the directory structure and the like. If the filesystem structures are not valid (i.e., corrupt), then the operating system 108 checks whether there is another available disk drive in the storage subsystem at step 512 and performs steps 508 through 516 as described hereinbefore. However, if it is determined at step 516 that the structures are valid, then the operating system 108 at step 518 mounts the root filesystem (e.g., 125 in FIG. 1) from disk drive X (e.g., disk drive 0) as the "active" root filesystem. The active root filesystem will remain intact until an event occurs, such as a configuration request for the storage subsystem 100 and/or a root filesystem notification/request for the root filesystem 125, as particularly described with reference to FIG. 1. The operating system 108 mounts the root filesystem by loading the necessary filesystem structures that describe the root filesystem from disk drive X into random access memory (i.e., "RAM") and maintaining the filesystem structures in RAM during operation of the storage subsystem 100. The "active" root filesystem enables the operating system to execute read/write/update requests to proper disk dives in the storage subsystem 100 according to the "active" root filesystem. At this point, the method flowchart continues to step 520, where the operating system executes the root filesystem manager 104. At step 522, the root filesystem manager 104 queries the operating system 108 via APIs provided by the operating system 108 for available disk drives in the storage subsystem 100. Steps 524 through 530 are particularly illustrated by exemplary pseudo code in functions replicateSystemDir( ) and replicateRootFiles( ) illustrated hereinabove in Table 2. Thus, at step 524 for each disk drive X available in the storage subsystem 100, the root filesystem manager 104 at step 526 verifies the associated mount point (i.e., "/mpt<x>", x being a numeral starting at 1 in the active root filesystem (i.e., mountPointCheck( ) in Table 2), and mounts the root filesystem for the available disk drive X (i.e., replicateRootFiles( ) in table 2) to the associated mounting point defined in the "active" root filesystem. If a mounting point for the available disk drive X does not exist, it is generated in the "active" root file system, i.e., a directory is created to mount the root filesystem for disk drive X in the "active" root filesystem. It should be noted that structures representing the active root filesystem in RAM are updated to reflect the newly generated mount point. Table 3 hereinbelow illustrates pseudo code for function setup_disk( ) for setting up mount points in the "active" root filesystem. Thereafter, the root filesystem manager 104 replicates the active root filesystem across the plurality of disk drives within the storage subsystem 100.

At step 528 it is determined whether there are other available disk drives in the storage subsystem 100, and the method flowchart 500 continues at step 524 for each successive available disk drive X, ending at step 530 once all available disk drives in the storage subsystem 100 have been processed.

Table 3 particularly illustrates pseudo code for function setup_disks( ) for setting up mount points in the active root filesystem.

TABLE 3

```
/*
***************************************************************
* This Function sets up mount points. The function takes a list of disk
* drives. The root disk drive is initialized by default as the first disk
* drive in the storage subsystem.
***************************************************************
*/
setup_disks(char **disks)
{
    FOR each disk in the disks list DO
        // Establish partitions on the disk and create a root filesystem
        in the root partition initParts(disk);
    END FOR
    // Create system directories in the active root filesystem
    mkdir("/dev");
    mkdir("/sys");
    mkdir("/sys/www");
    mkdir("/sys/var");
    mkdir("/sys/var/log");
    mkdir("/sys/var/tmp");
    mkdir("/mpt");
    mkdir("/mpt0");
    mkdir("/mpt1");
    mkdir("/mpt2");
    mkdir("/mpt3");
    mkdir("/mpt4");
    mkdir("/mpt5");
}
```

While the invention has been particularly shown and described to a preferred embodiment thereof, it will be understood by those skilled in the art that the foregoing and other changes in forma and details may be made therein without departing from the spirit and scope of the invention.

Having thus described our invention, what we claim as new, and desire to secure by Letters Patent is:

1. A method for maintaining an active root filesystem in a storage subsystem comprising a plurality of storage devices, the method comprising:
  a) searching root partitions of the plurality of storage devices for a valid root filesystem, the root filesystem including mount points associated with the plurality of storage devices;
  b) mounting a root filesystem that is found first as the active root filesystem and mounting root partitions of the plurality of storage devices to the associated mount points within the active root filesystem; and
  c) replicating the active root filesystem across the plurality of storage devices in the storage subsystem, wherein the storage subsystem is bootable from any storage device of the plurality of storage devices that includes a replica of the active root filesystem.

2. The method for maintaining an active root filesystem according to claim 1, wherein the active root filesystem is mounted within a random access memory associated with the storage subsystem for directing read, write and update requests to appropriate storage devices in the storage subsystem according to the active root filesystem.

3. The method for maintaining an active root filesystem according to claim 1, wherein each of the mount points in the active root filesystem is associated with a particular storage device of the plurality of storage devices within storage subsystem.

4. The method for maintaining an active root filesystem according to claim 1, wherein a valid root filesystem is represented by a root flag in a reserved area within a root partition of a storage device which indicates that a root filesystem which is stored in the root partition is valid.

5. The method for maintaining an active root filesystem according to claim 1, the method further comprising a step of setting a root flag in a reserved area of a root partition of an associated storage device after replicating the active root filesystem to indicate that the root partition includes a valid root filesystem.

6. The method for maintaining an active root filesystem according to claim 1, the method further comprising the steps of:
  determining a number of storage devices additionally installed in the storage subsystem in response to receiving a notification that one or more storage devices in the storage subsystem have failed;
  replicating the active root filesystem to each of the determined number of additionally installed storage devices; and
  setting a root flag in the reserved area of the root partition of each additionally installed storage device to indicate that the root partition of each additionally installed storage device includes a valid root filesystem.

7. The method for maintaining an active root filesystem according to claim 6, further comprising a step of setting the root flag in the reserved area of the root partition of each additionally installed storage device before replicating the active root filesystem to indicate that the additionally installed storage device does not have a valid root filesystem and is ready to receive a replica of the active root filesystem.

8. The method for maintaining an active root filesystem according to claim 1, the method further comprising the steps of:
  updating the active root filesystem according to a configuration request affecting the active root filesystem;
  replicating the active root filesystem to each of the plurality of storage devices within the storage subsystem; and
  setting the root flag in the reserved area of the root partition of each of the plurality of storage devices in the storage subsystem to indicate that the root partition of each of the plurality of storage devices in the storage subsystem includes a valid root filesystem.

9. The method for maintaining an active root filesystem according to claim 8, further comprising a step of setting the root flag in the reserved area of the root partition of each of the plurality of storage device in the storage subsystem before replicating the active root filesystem to indicate that each storage device does not have a valid root filesystem and is ready to receive a replica of the active root filesystem.

10. A storage subsystem for maintaining an active root filesystem, the storage subsystem comprising a plurality of storage devices, the storage subsystem comprising a root filesystem manager for:

a) searching root partitions of the plurality of storage devices for a valid root filesystem, the root filesystem including mount points associated with the plurality of storage devices;

b) mounting a root filesystem that is found first as the active root filesystem and mounting root partitions of the plurality of storage devices to the associated mount points within the active root filesystem;

c) replicating the active root filesystem across the plurality of storage devices in the storage subsystem, wherein the storage subsystem is bootable from any storage device of the plurality of storage devices that includes a replica of the active root filesystem.

11. The storage subsystem for maintaining an active root filesystem according to claim 10, wherein the active root filesystem is mounted within a random access memory associated with the storage subsystem for directing read, write and update requests to appropriate storage devices in the storage subsystem according to the active root filesystem.

12. The storage subsystem for maintaining an active root filesystem according to claim 10, wherein each of the mount points in the active root filesystem is associated with a particular storage device of the plurality of storage devices within storage subsystem.

13. The storage subsystem for maintaining an active root filesystem according to claim 10, wherein a valid root filesystem is represented by a root flag in a reserved area within a root partition of a storage device which indicates that a root filesystem which is stored in the root partition is valid.

14. The storage subsystem for maintaining an active root filesystem according to claim 10, the root filesystem manager further setting a root flag in a reserved area of a root partition of an associated storage device after replicating the active root filesystem to indicate that the root partition includes a valid root file system.

15. The storage subsystem for maintaining an active root filesystem according to claim 10, the root filesystem manager further:

determining a number of storage devices additionally installed in the storage subsystem in response to receiving a notification that one or more storage devices in the storage subsystem have failed;

replicating the active root filesystem to the each of the determined number of additionally installed storage devices; and setting a root flag in a reserved area of a root partition of each additionally installed storage device to indicate that the root partition of each additionally installed storage device includes a valid root filesystem.

16. The storage subsystem for maintaining an active root filesystem according to claim 15, the root filesystem further setting the root flag in the reserved area of the root partition of each additionally installed storage device before replicating the active root filesystem to indicate that the additionally installed storage device does not have a valid root filesystem and is ready to receive a replica of the active root filesystem.

17. The storage subsystem for maintaining an active root filesystem according to claim 10, the root filesystem manager further:

updating the active root filesystem according to a configuration request affecting the active root filesystem;

replicating the active root filesystem to each of the plurality of storage device within the storage subsystem; and setting a root flag in a reserved area of the root partition of each of the plurality of storage devices in the storage subsystem to indicate that the root partition of each of the plurality of storage devices in the storage subsystem includes a valid root filesystem.

18. The storage subsystem for maintaining an active root filesystem according to claim 17, the root filesystem manager further setting the root flag in the reserved area of the root partition of each of the plurality of storage device in the storage subsystem before replicating the active root filesystem to indicate that each storage device does not have a valid root filesystem and is ready to receive a replica of the active root filesystem.

19. A program storage device, tangibly embodying a program of instructions executable by a machine to perform a method for maintaining an active root filesystem in a storage subsystem comprising a plurality of storage devices, the method comprising the steps of:

a) searching root partitions of the plurality of storage devices for a valid root filesystem, the root filesystem including mount points associated with the plurality of storage devices;

b) mounting a root filesystem that is found first as the active root filesystem and mounting root partitions of the plurality of storage devices to the associated mount points within the active root filesystem; and c) replicating the active root filesystem across the plurality of storage devices in the storage subsystem, wherein the storage subsystem is bootable from any storage device of the plurality of storage devices that includes a replica of the active root filesystem.

20. The program storage device according to claim 19, wherein the active root filesystem is mounted within a random access memory associated with the storage subsystem for directing read, write and update requests to appropriate storage devices in the storage subsystem according to the active root filesystem.

21. The program storage device according to claim 19, wherein each of the mount points in the active root filesystem is associated with a particular storage device of the plurality of storage devices within storage subsystem.

22. The program storage device according to claim 19, wherein a valid root filesystem is represented by a root flag in a reserved area within a root partition of a storage device which indicates that a root filesystem which is stored in the root partition is valid.

23. The program storage device according to claim 19, the method further comprising a step of setting a root flag in a reserved area of a root partition of an associated storage device after replicating the active root filesystem to indicate that the root partition includes a valid root filesystem.

24. The program storage device according to claim 19, the method further comprising the steps of:

determining a number of storage devices additionally installed in the storage subsystem in response to receiving a notification that one or more storage devices in the storage subsystem have failed;

replicating the active root filesystem to the each of the determined number of additionally installed storage devices; and setting a root flag in the reserved area of the root partition of each additionally installed storage device to indicate that the root partition of each additionally installed storage device includes a valid root filesystem.

25. The program storage device according to claim 24, further comprising a step of setting the root flag in the reserved area of the root partition of each additionally installed storage device before replicating the active root filesystem to indicate that the additionally installed storage device does not have a valid root filesystem and is ready to receive a replica of the active root filesystem.

26. The program storage device according to claim 19, the method further comprising the steps of:

updating the active root filesystem according to a configuration request affecting the active root filesystem;

replicating the active root filesystem to each of the plurality of storage devices within the storage subsystem; and setting the root flag in the reserved area of the root partition of each of the plurality of storage devices in the storage subsystem to indicate that the root partition of each of the plurality of storage devices in the storage subsystem includes a valid root filesystem.

27. The program storage device according to claim 26, further comprising a step of setting the root flag in the reserved area of the root partition of each of the plurality of storage device in the storage subsystem before replicating the active root filesystem to indicate that each storage device does not have a valid root filesystem and is ready to receive a replica of the active root filesystem.

* * * * *

UNITED STATES PATENT AND TRADEMARK OFFICE
CERTIFICATE OF CORRECTION

PATENT NO. : 6,779,130 B2
DATED : August 17, 2004
INVENTOR(S) : Roger C. Sprunt et al.

It is certified that error appears in the above-identified patent and that said Letters Patent is hereby corrected as shown below:

Title page,
Item [74], *Attorney, Agent, or Firm*, "Juan" should read -- Jean --

Column 7,
Line 19, "partition disk" should read -- partition_disk --

Column 13,
Line 9, "At step..." should not begin a new paragraph

Signed and Sealed this

Twenty-first Day of December, 2004

JON W. DUDAS
*Director of the United States Patent and Trademark Office*